US012339065B2

(12) United States Patent
Thut

(10) Patent No.: US 12,339,065 B2
(45) Date of Patent: Jun. 24, 2025

(54) PUMP SYSTEM FOR TRANSFERRING MOLTEN METAL

(71) Applicant: Niklaus Thut, Chagrin Falls, OH (US)

(72) Inventor: Niklaus Thut, Chagrin Falls, OH (US)

( * ) Notice: Subject to any disclaimer, the term of this patent is extended or adjusted under 35 U.S.C. 154(b) by 554 days.

(21) Appl. No.: 17/885,229

(22) Filed: Aug. 10, 2022

(65) Prior Publication Data

US 2024/0053100 A1 Feb. 15, 2024

(51) Int. Cl.
*F27D 3/14* (2006.01)
*F27D 27/00* (2010.01)

(52) U.S. Cl.
CPC ............ *F27D 3/14* (2013.01); *F27D 27/005* (2013.01)

(58) Field of Classification Search
CPC ................................ F27D 3/14; F27D 27/005
See application file for complete search history.

(56) References Cited

U.S. PATENT DOCUMENTS

2004/0096330 A1* 5/2004 Gilbert .................... F04D 7/065 415/200
2014/0369859 A1* 12/2014 Thut .................... F04D 29/086 417/54

* cited by examiner

*Primary Examiner* — Keith D. Hendricks
*Assistant Examiner* — Moriah S. Smoot

(57) ABSTRACT

A pump system for transferring molten metal includes a pump for pumping molten metal. The pump includes a motor. The pump also includes a base adapted to be submerged in molten metal contained in a vessel including at least one inlet opening, an outlet opening and an impeller chamber fluidly communicating with the at least one inlet opening and the outlet opening. A shaft sleeve is part of the pump and is adapted to fasten to the base and extends outside the molten metal. An impeller is part of the pump and is adapted for rotation inside the impeller chamber. The pump includes a shaft driven by the motor and extends in the shaft sleeve. The impeller is fastened to the shaft. The pump system also includes a transfer block that is adapted to be submerged in the molten metal and to extend outside the molten metal. The transfer block includes an interior wall extending along its height, an inlet opening that receives molten metal from the base, and an outlet. The transfer block includes an obstruction member disposed in an interior thereof that disrupts an initial flow path of molten metal inlet into the transfer block from the base. The transfer block includes a diffuser plate inside the interior thereof. The diffuser plate includes through holes formed therein. Another aspect is a refractory transfer block with an obstruction member and a diffuser plate, which, for example, can be used with a pump for pumping molten metal.

25 Claims, 9 Drawing Sheets

FIG. 6A
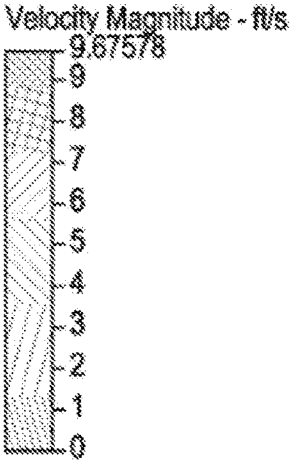
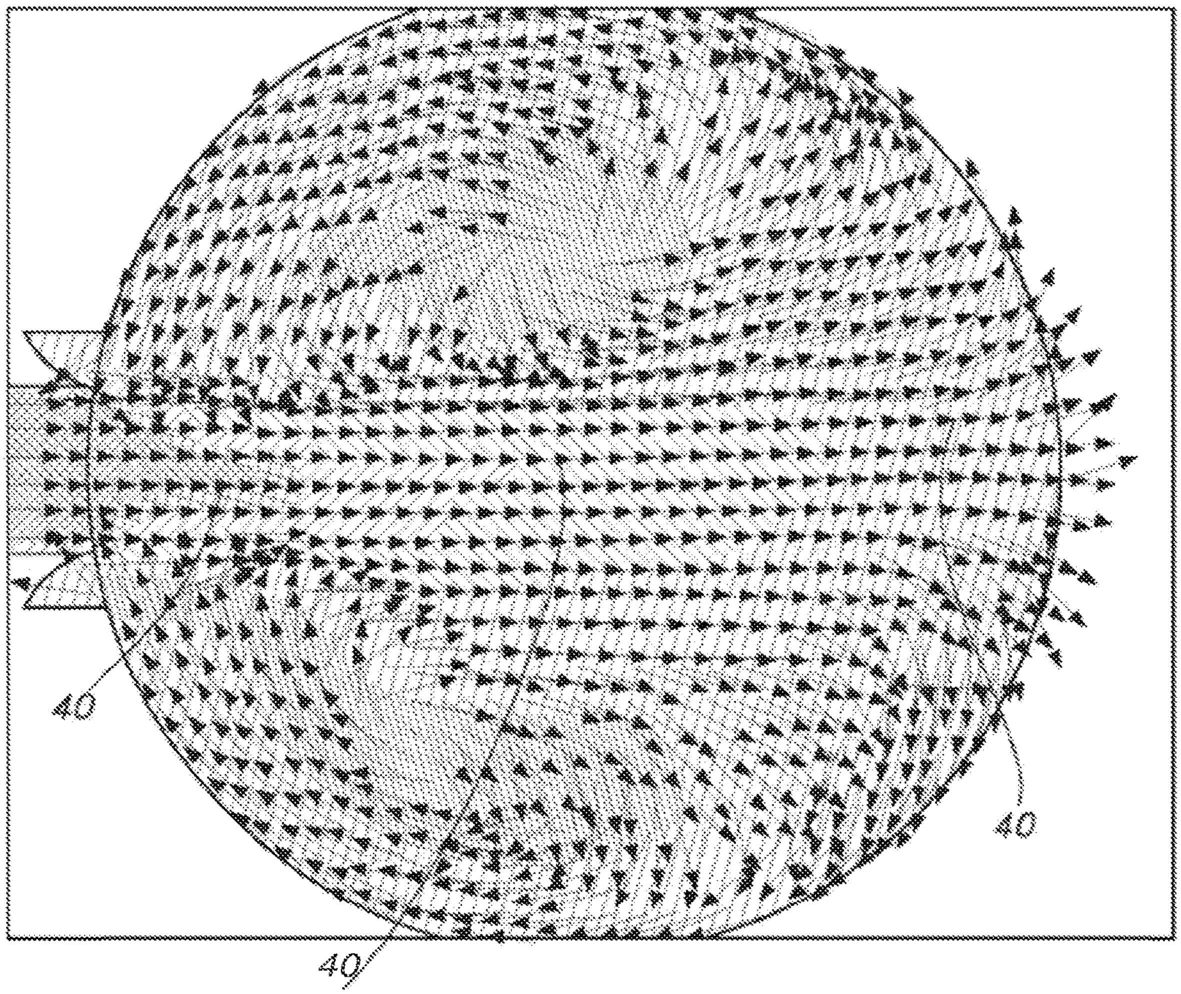
FIG.6B

FIG. 8A
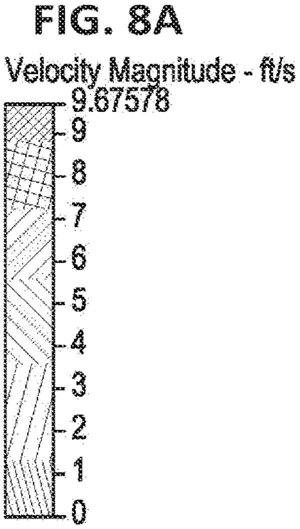
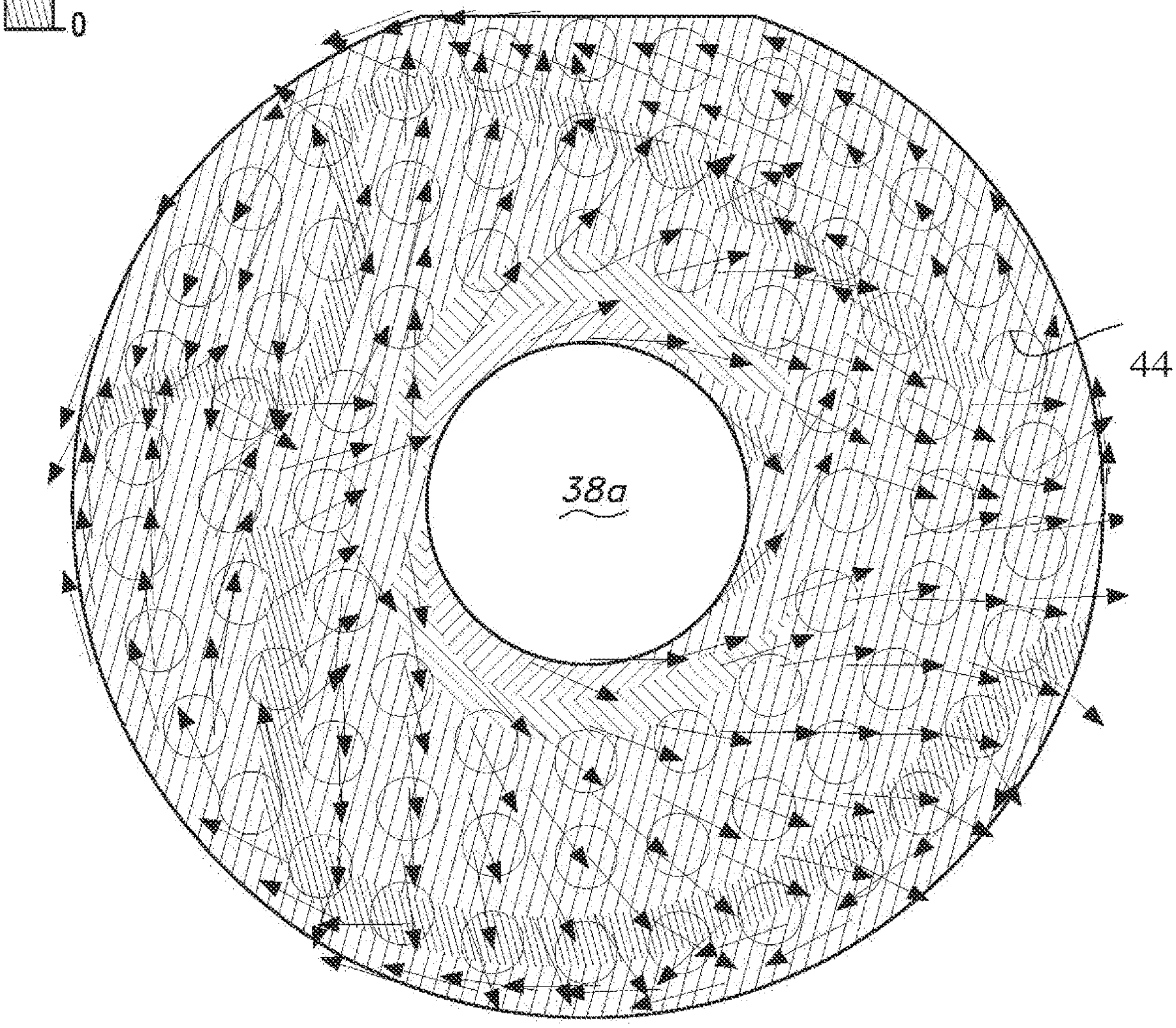
FIG.8B

FIG. 9A
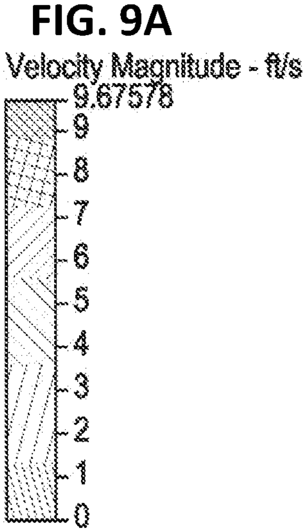
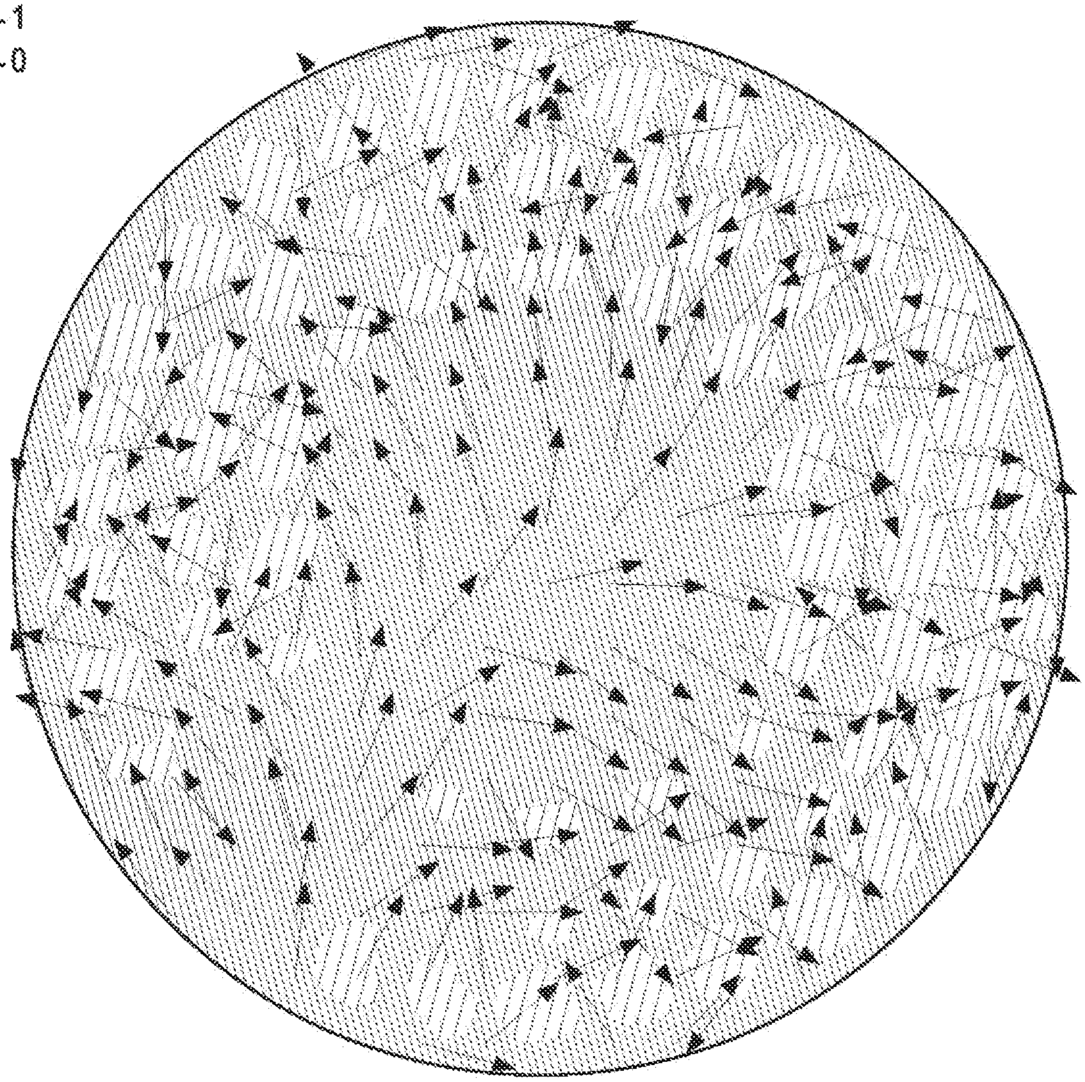
FIG. 9B

PUMP SYSTEM FOR TRANSFERRING MOLTEN METAL

FIELD OF THE DISCLOSURE

The disclosure relates to the field of pumps and devices for transferring molten metal.

BACKGROUND OF THE DISCLOSURE

Pumps are used for transferring molten metal. In one type of pump, molten metal is inlet into the base by a rotating impeller, travels into the bottom of a vertical riser and flows upwards to an outlet from which the molten metal travels to its intended destination. A typical riser used in a pump manufactured by High Temperature Systems, Inc., rated at about 4000 pounds/minute of aluminum flow, has an inner diameter (ID) of about 3 inches, and there is downstream piping associated with it having this diameter. This results in a metal velocity at about 9 feet/second. While the inside of the riser is not a large concern, because oxide generation inside the riser is limited by the small surface area, at the outlet of the riser high turbulence causes existing oxide layers to be constantly broken and reformed, leading to a large oxide generation. Typically, this may not be a great concern if the next step is to purify the metal anyway, but some operations skip degassing/fluxing and take the molten metal straight to casting/final production. There are small metal losses through the oxide formation regardless of whether purifying or not, but typically this prior art pumping system is still better than most other transfer methods.

When the pump is running, the outlet opening of the pump causes a stream of metal to flow to the back of the prior art riser very quickly, and can cause high turbulence and splashing on the surface of the metal (see FIG. 6) in which different molten metal velocity is represented by different cross-hatching as shown in the legend on the page. This is seen in simulations, water models, and fully-installed systems from other companies. This eventually dissipates as the metal level rises, but specifically when the pump starts, one either has to do a slow start (start the pump by slowly increasing the speed at which it operates until the desired speed is reached), which disadvantageously extends transfer times, or one will need to accept the dross formation if a quick start is needed, which is disadvantageous.

SUMMARY OF THE DISCLOSURE

Referring to a first aspect of the disclosure, a pump system for transferring molten metal includes a pump that includes a motor. The pump also includes a base that is adapted to be submerged in molten metal contained in a vessel, the base including at least one inlet opening, an outlet opening and an impeller chamber fluidly communicating with the at least one inlet opening and the outlet opening. A shaft sleeve is part of the pump and is adapted to fasten to the base and extends outside the molten metal. An impeller is part of the pump and is adapted for rotation inside the impeller chamber. The pump includes a shaft that is driven by the motor and extends in the shaft sleeve. The impeller is fastened to the shaft. The pump system includes a transfer block that is adapted to be submerged in the molten metal and extends outside the molten metal. The transfer block includes an interior wall extending along its height, an inlet opening that receives molten metal outlet from the outlet opening of the base, and an outlet. The transfer block includes an obstruction member disposed in an interior thereof that disrupts an initial flow path of molten metal inlet into the transfer block from the base. The transfer block includes a diffuser plate inside the interior thereof. The diffuser plate includes through holes formed therein.

Referring to specific features of the first aspect, taken alone or in any combination, a nozzle fluidly communicates molten metal from the outlet opening of the base to the inlet opening of the transfer block.

Another feature is that the obstruction member is a post having a circular cross-sectional shape. A further feature is that the transfer block is formed of cast ceramic material and the post is part of the cast ceramic material. Yet another feature is that the post is centrally located in the interior volume, an annular space being disposed radially outward of the post between the interior wall and the post, the diffuser plate forming an upper surface of the annular space.

Another feature is that the transfer block comprises a detachable outlet spout.

Further, the interior wall can include at least two or more notches or protruding guides adapted to engage the diffuser plate to prevent rotation of the diffuser plate. In one example, vertically extending guides or ribs protrude inwardly from the interior wall, at least two spaced apart guides being used, which are received in notches of the diffuser plate. Another feature is that the guides end spaced above the obstruction member, permitting the diffuser plate to be rotated into a fixed position once it is lowered past the guides. Another feature includes structure adapted to rotationally lock the diffuser plate into the fixed position.

Another variation is that the interior wall and the diffuser plate have a circular shape in a top view and the diffuser plate contacts the interior wall. In this exemplary feature, the diffuser plate is disposed above and near the obstruction member.

In particular, all components of the pump that contact molten metal can be comprised of a refractory material.

Another feature is a lid for covering the transfer block near the upper end portion, the lid including a fitting around an opening for receiving a conduit for flowing inert gas into the transfer block.

Yet another feature is that the through holes of the diffuser plate are at least 2 inch in size.

In another feature the diameter of the interior wall of the transfer block is at least 8 inches.

In one example, the diameter of the interior wall of the transfer block is at least 8 inches for use with a pump rated at about 1000 Lbs/Min of metal flow. In another example, the diameter of the interior wall of the transfer block is at least 12 inches for use with a pump rated at about 4000 Lbs/Min of metal flow. In another example, the diameter of the interior wall of the transfer block is at least 16 inches for use with a pump rated at about 4000 Lbs/Min of metal flow.

A second aspect of the disclosure features a refractory transfer block for transferring molten metal that is adapted to be submerged in molten metal and to extend outside the molten metal. The transfer block includes an interior wall extending along a height thereof and forming an interior volume. There is a lower inlet opening that is adapted to receive an initial flow path of molten metal that flows into the interior volume, and an outlet. An obstruction member is disposed in the interior thereof that is adapted to disrupt the initial flow path of molten metal. A diffuser plate is disposed in the interior volume including through holes formed therein.

Referring to more specific features of the second aspect of the disclosure alone or in any combination, in one feature the transfer block is formed of cast ceramic material and the obstruction member includes a post that is part of the cast ceramic material.

In another feature the interior wall and the diffuser member have a generally circular shape from a top view. The obstruction member includes a cylindrical post that is centrally located in the interior of the transfer block. An annular space is disposed radially outward of the post between the interior wall and the post. The diffuser plate forms an upper surface of the annular space.

In yet another feature the interior wall includes at least two notches or protruding guides adapted to engage the diffuser plate to prevent rotation of the diffuser plate. In one example, vertically extending guides or ribs protrude inwardly from the interior wall, at least two spaced apart guides being used, which are received in notches of the diffuser plate.

Another feature is that the guides end spaced above the obstruction member, permitting the diffuser plate to be rotated into a fixed position once it is lowered past the guides.

In another feature the transfer block includes structure adapted to rotationally lock the diffuser plate into the fixed position.

A further feature is that the transfer block comprises support structure adapted to be fastened above and to a vessel containing the molten metal. The transfer block and a pump that provides the initial flow path of molten metal are adapted to be mounted to the support structure. Together the pump and the transfer block are able to be repeatedly submerged into and removed from the molten metal of the vessel when moving the support structure.

In another feature a lid covers the transfer block outside the molten metal. A fitting around an opening in the lid receives a conduit for flowing inert gas into the transfer block.

Still further is a feature in which the diameter of the holes of the diffuser plate is, for example, at least ½ inch, or at least 1 inch, and in particular, ranges from 2 inch to 1 inch. All numerical ranges used in this disclosure include the endpoint if one endpoint is used, and both endpoints if two endpoints are used.

Another feature is that the interior wall of the transfer block is circular in a top view. The diameter of the interior wall (ID) of the transfer block can be one of the following: at least 8 inches, at least 10 inches, at least 12 inches, at least 16 inches and at least 24 inches.

The disclosure now refers to the drawings and Detailed description that follows.

BRIEF DESCRIPTION OF THE DRAWINGS

FIG. 6B shows the top view looking down inside the transfer block during a simulation of molten metal flow, the initial flow path of molten metal into the transfer block being shown and being unobstructed; a legend of FIG. 6A shows the velocity magnitude of molten metal flow inside the transfer block corresponding to particular cross-hatching;

FIG. 8B shows the top view looking down inside the transfer block during a simulation of molten metal flow at a region just below the diffuser plate which was in the lower fixed position for the simulation but is not shown; a legend of FIG. 8A shows the velocity magnitude of molten metal flow inside the transfer block corresponding to particular cross-hatching; and FIG. 9B shows the top view looking down inside the transfer block during a simulation of molten metal flow at a region just above the diffuser plate which was in the lower fixed position for the simulation but is not shown; a legend of FIG. 9A shows the velocity magnitude of molten metal flow inside the transfer block corresponding to particular cross-hatching.

DETAILED DESCRIPTION

Figure 1:
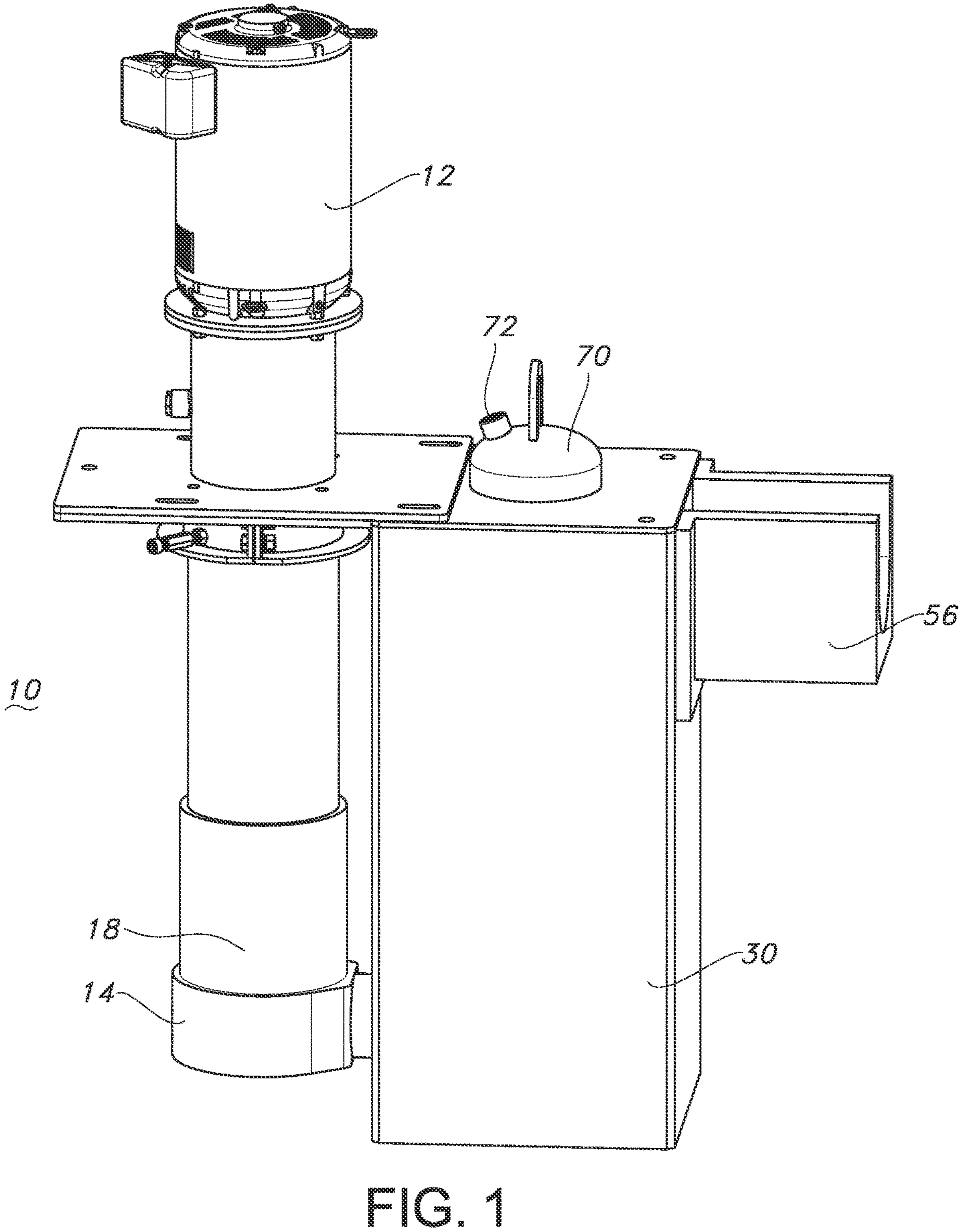
FIG. 1 is a perspective view of the molten metal transfer pumping system of the disclosure.
Figure 2:
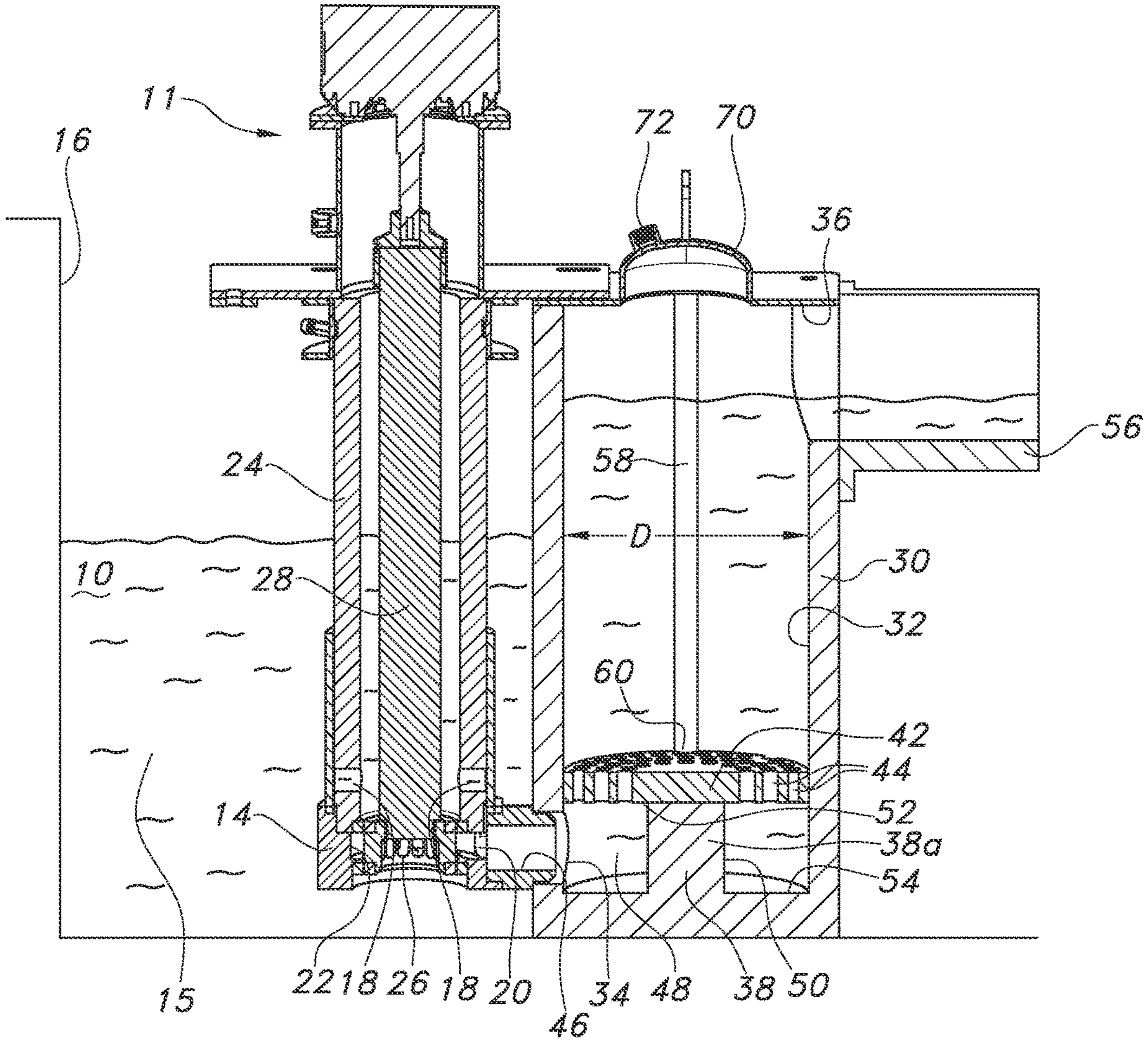
FIG. 2 is a cross-sectional view of the molten metal transfer pumping system of FIG. 1.

Referring to FIGS. 1 and 2, a pump system 10 for transferring molten metal includes a pump 11 that includes a motor 12. A base 14 is part of the pump 11 and is submerged in molten metal 15 contained in a vessel 16. The base 14 includes at least one base inlet opening 18, a base outlet opening 20 and an impeller chamber 22 fluidly communicating with the at least one base inlet opening 18 and the base outlet opening 20. The pump 11 includes a shaft sleeve 24 that is fastened to the base 14 and extends outside the molten metal 15. An impeller 26 is part of the pump 11 and is adapted for rotation inside the impeller chamber 22. A shaft 28 is part of the pump 11, is driven by the motor 12 and extends in the shaft sleeve 24. The impeller 26 is fastened to a lower end portion of the shaft 28. The pump system 10 also includes a transfer block 30 that is submerged in the molten metal and extends outside the molten metal. The transfer block can have various exterior shapes including square, rectangular or cylindrical. The transfer block 30 includes an interior wall 32 extending along its height, a transfer block inlet opening 34 near a lower end portion of the transfer block 30 that receives molten metal from the base, and a transfer block outlet 36 near an upper end portion of the transfer block from which molten metal leaves the transfer block 30. The interior wall 32 of the transfer block 30 forms a volume that can be any shape including square or rectangular but in particular is cylindrical and can be considered a bowl. The transfer block 30 includes an obstruction member 38 disposed in an interior near the lower end portion thereof that disrupts an initial flow path 40 of molten metal (e.g., the initial flow path being of a high velocity molten metal such as outlet from a pump) inlet into the transfer block 30 from the base 14. The transfer block 30 includes a diffuser plate 42 inside the interior thereof located above the obstruction member 38. The diffuser plate 42 includes through holes 44 formed therein. This permits substantial molten metal flow through the diffuser plate 42.

A nozzle 46 fluidly communicates molten metal from the base outlet opening 20 to the transfer block inlet opening 34.

In particular, the obstruction member 38 is a cylindrical post **38*a*. Further, for example, the transfer block 30 is formed of cast ceramic material and the post 38***a*, for example, is part of the cast ceramic material (i.e., the transfer block 30 and the post 38*a* are cast together). The post 38*a* is, for example, centrally located in the interior of the transfer block 30. An annular space 48 is disposed radially outward of the post 38*a* between the interior wall 32 and the exterior surface 50 of the post 38*a*. The diffuser plate 42 is located, for example, above the post 38*a*, and, in particular, is near or contacts the post and its lower surface 52 forms an upper surface of the annular space 48. The transfer block 30 includes a bottom interior surface 54 that forms a bottom surface of the annular space 48. The transfer block 30 includes a detachable outlet spout 56.

Figure 3:
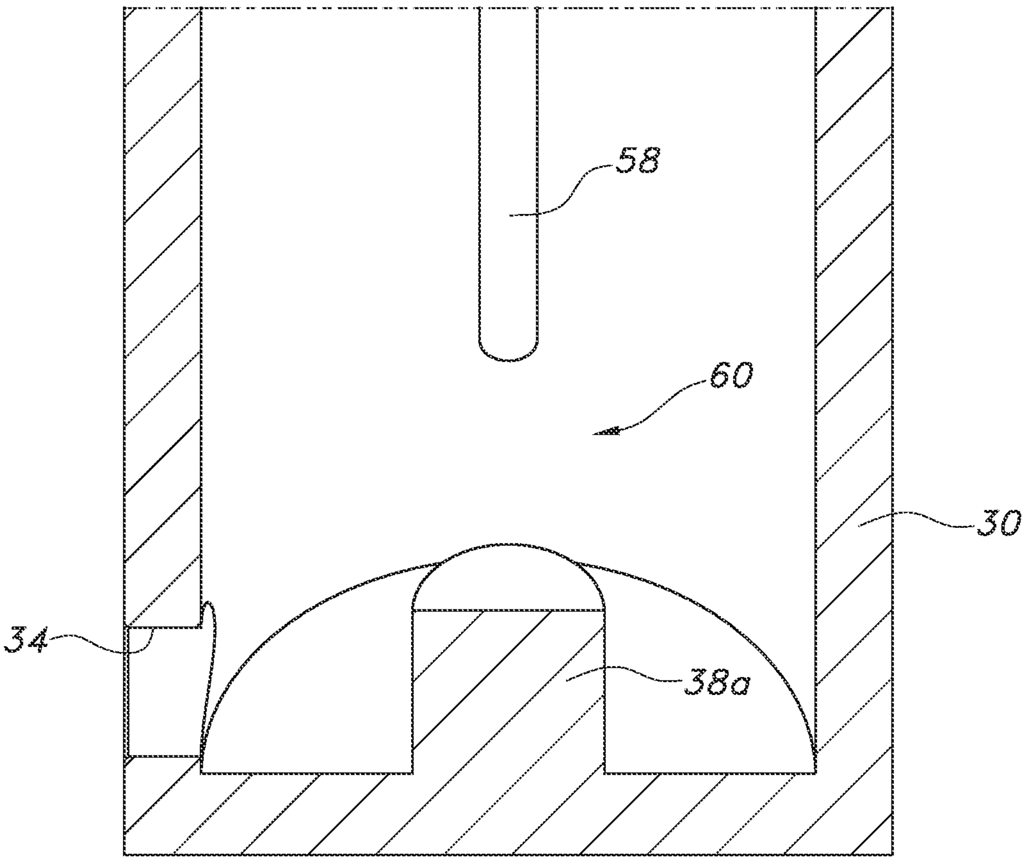
FIG. 3 is a cross-sectional view of a transfer block of the disclosure without a diffuser plate.
Figure 4:
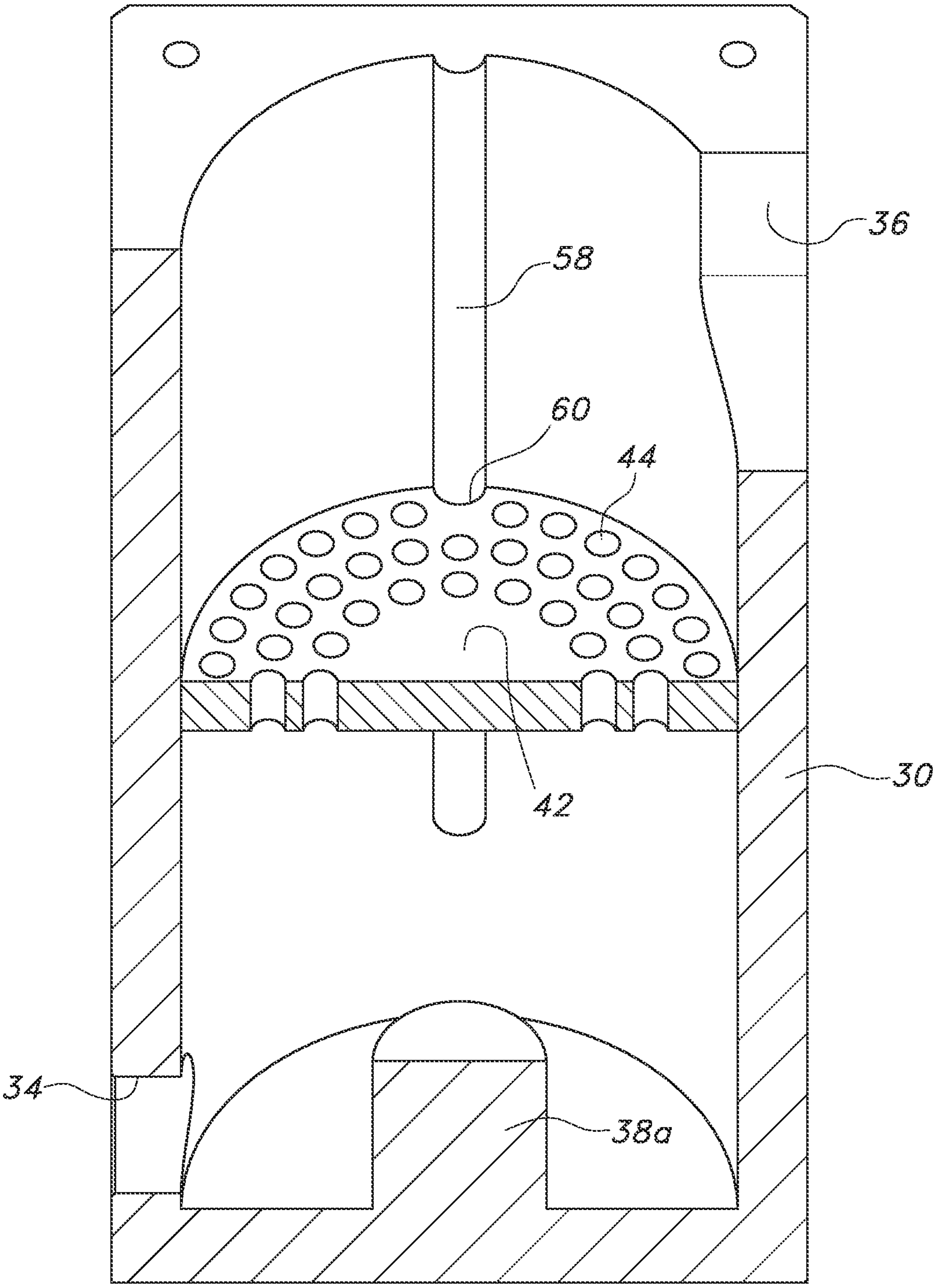
FIG. 4 is a cross-sectional view like FIG. 3, showing a diffuser plate being lowered inside the transfer block.
Figure 5:
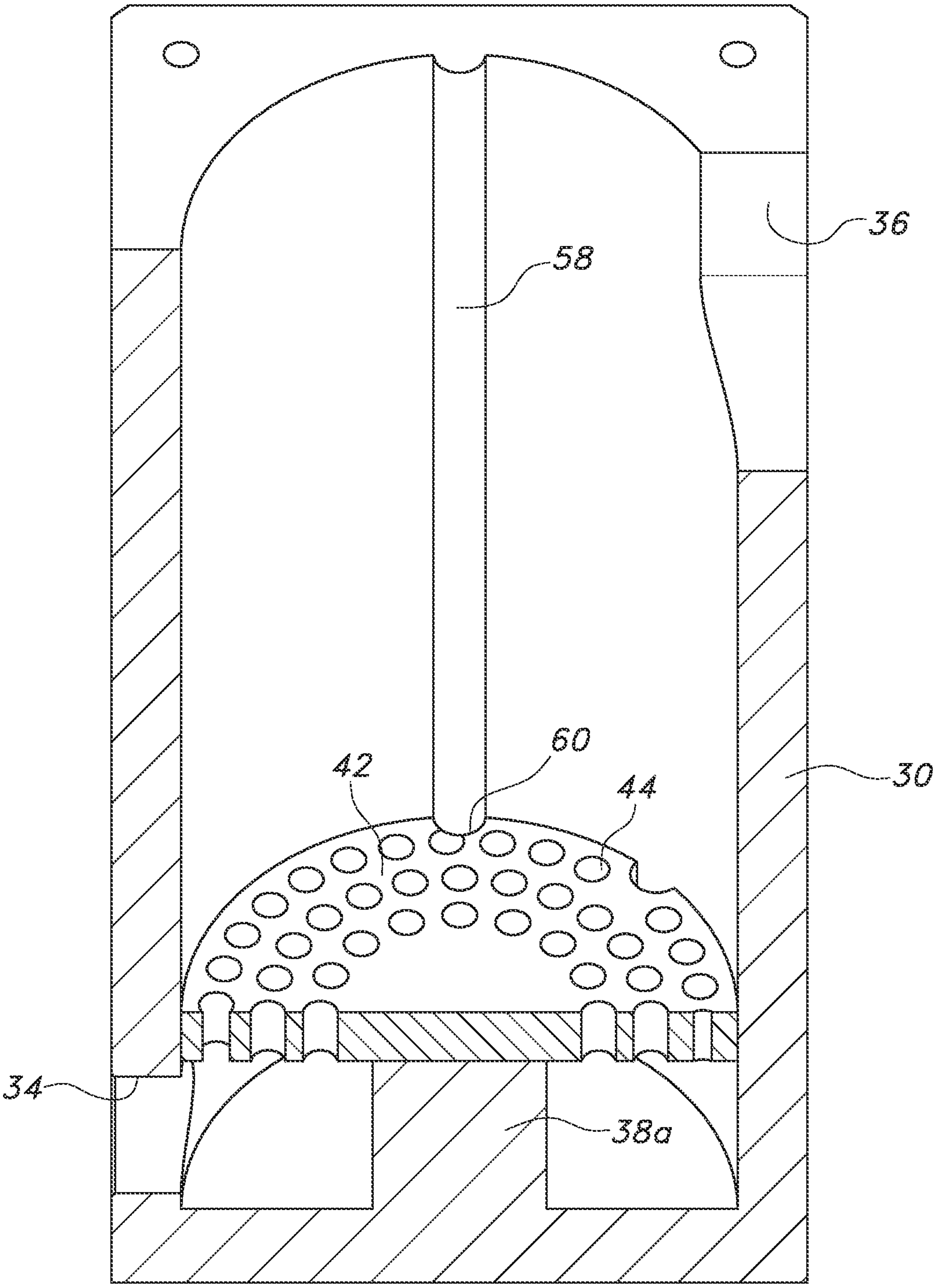
FIG. 5 is a cross-sectional view showing the diffuser plate in a fixed, lower, rotated position relative to its position in FIG. 4.

Referring to FIGS. 3-5, the diffuser plate 42 can be replaced without removal of the transfer block 30. At least two guides 58 are disposed on the sides of the bowl (e.g., diametrically opposed) along the height of the transfer block 30 (protruding inwardly from the interior wall 32 of the transfer block 30) and notches 60 are formed in the diffuser plate that are adapted to receive the guides 58. This allows the diffuser plate 42 to be lowered into the bowl, for example, without rotation, pushed to the bottom then fixed in place. In another variation the diffuser plate 42 could include at least two projecting guides that engage vertical notches in the interior wall 32 of the transfer block 30 and the notches communicate with a circumferential horizontal notch in the interior wall 32 to fix the diffuser plate into position. The at least two guides 58 (and notches 60) prevent rotation of the diffuser plate 42. In addition, the transfer block 30 can include structure adapted to rotationally lock the diffuser plate in the fixed position. Since it is below the metal, the diffuser plate 42 cannot become frozen in place by the molten metal. This also means that should the diffuser plate 42 become clogged or worn out, the maintenance can be done quickly and easily.

More specifically, the notches 60 of the diffuser plate 42 engage the guides 58 or ribs so that the diffuser plate 42 can slide vertically down the transfer block along the guides 58 without being permitted to rotate until near the central post 38*a*. The guides 58 can terminate just above the central post 38*a* to form a channel 60 located between the bottom of the guides 58 and the top of the post 38*a*, which permits the diffuser plate 42 to be rotated into a fixed position. The transfer block 30 could include a stop member that limits rotation of the diffuser plate 42 at its lowered position. In particular, the interior wall 32 can define a cylindrical volume of the transfer block 30 and the diffuser plate 42 can have a circular disk shape. Alternatively, the diffuser plate 42 and the interior wall 32 could have other shapes such as square or rectangular.

In a variation, the diffuser plate 42 may be located around the post 38*a* (below the top of the post 38*a*) with the diffuser plate 42 including a central opening that receives the post 38*a* and can be fastened to it such as by a threaded connection or other suitable connection. For example, the guides 58 may extend below the upper surface of the post 38*a* and are received in the notches 60 of the diffuser plate 42. The post 38*a* may include a ceramic ring fastened below its upper surface. The guides 58 may end above the ceramic ring forming a channel between the bottom of the guides 58 and the ceramic ring. The diffuser plate 42 can be pushed downward past the guides 58 into the channel and rests on the ring attached to the post after being rotated into a fixed position.

All components of the pump system 10 that contact molten metal are formed of a refractory material. For example, the base 14, shaft sleeve 24, impeller 26 and shaft 28 can be formed of graphite. In one aspect, the transfer block 30 can be formed of a suitable refractory material including but not limited to a cast ceramic material, for example, silicon carbide, alumina, silica or combinations thereof.

Another feature is a lid 70 for covering the transfer block 30 near its upper end portion. A fitting 72 around an opening receives a conduit for flowing inert gas to the molten metal contained in the transfer block 30. The inert gas flows to the surface of molten metal inside the transfer block 30 and may flow into that molten metal, further reducing a possibility of formation of metal oxides.

The shaft sleeve of the pump and the motor are mounted to a metal plate. The transfer block is also mounted to the metal plate. The metal plate can include a hook or other structure enabling the pump and transfer block to be removed from, and submerged into, the molten metal together as one unit.

This design of the molten metal transfer system of this disclosure reduces turbulence, specifically at the top surface of the metal, to generate less oxides when performing molten metal transfer. The molten metal transfer system of this disclosure increases the surface area of the transfer block 30 (e.g., the ID of the transfer block) compared to an ordinary riser's inner chamber (e.g., ID) so that the metal velocity is lowered for the same volume of metal transferred. The diameter D of the interior wall 32 forming, for example, a cylindrical shaped volume in the transfer block 30 is larger than the inner diameter of a typical riser used for that particular pump rating, by at least 2 times, or at least three times, or at least 4 times, or at least 5 times. For example, a transfer pump manufactured by High Temperature Systems, Inc., rated at about 4000 Lbs/Min of aluminum flow would typically have a riser ID of about 3 inches, as would the downstream piping associated with it. A molten metal transfer system according to this disclosure, including a pump rated at 4000 Lbs/Min of aluminum flow, can have an inner diameter of the transfer block (i.e., interior wall diameter D) of about 16 inches or more, for example. This reduces the metal flow velocity to 0.32 feet/second. This greatly reduces the possibility of breaking the top oxide surface layer and protects the metal underneath it from oxidation.

Figures 7A, 7B:
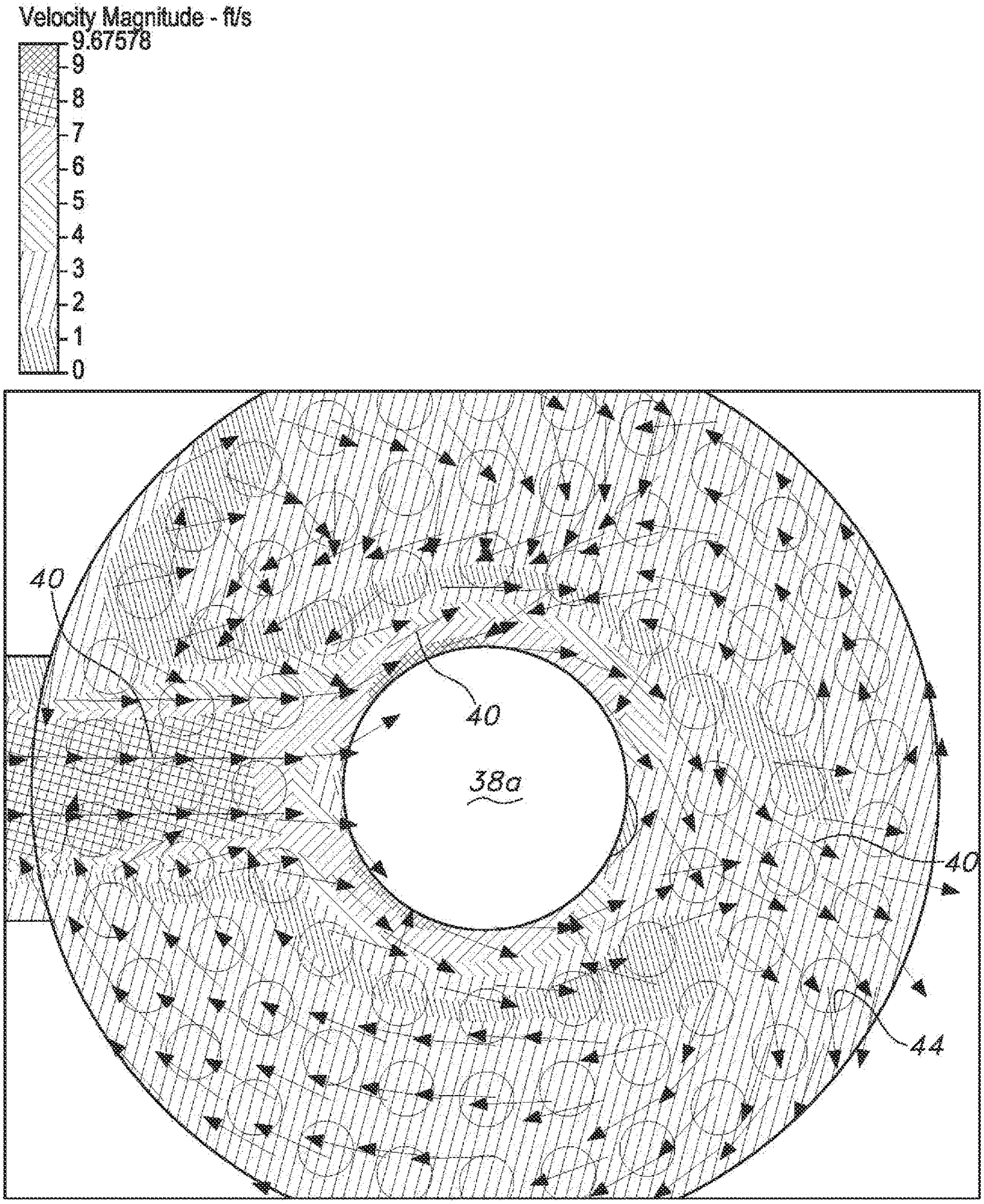
FIG. 7B shows the top view looking down inside the transfer block during a simulation of molten metal flow, the initial flow path of molten metal into the transfer block being shown as deflected by an obstruction member located in the interior volume of the transfer block; a legend of FIG. 7A shows the velocity magnitude of molten metal flow inside the transfer block corresponding to particular cross-hatching.

Referring to FIGS. 6B and 7B, introducing the center post 38*a* into the transfer block 30 causes the initial flow path of metal to flow around the post 38*a* and slow down before it hits the interior wall. FIG. 6B shows results of a simulation of metal flow in a transfer block without the center post. The legends of FIGS. 6A, 7A, 8A and 9A show approximate metal velocity for each cross hatching type in the simulation. Type 9 of cross-hatching represents the highest velocity of the molten metal, type 1 of cross-hatching represents the lowest velocity of molten metal, and types of cross-hatching 8-2 represent progressively lower velocities between cross-hatching types 9 and 1. The arrows are representations of flow directions inside the transfer block.

The transfer block in FIG. 7B employs the central post 38*a* as the obstruction member, which is positioned in the initial flow path 40 of the molten metal that is discharged from the pump (out the outlet of the base 14), though the discharge nozzle, into the transfer block inlet opening 34. FIG. 7B shows that the initial flow path 40 of molten metal is disrupted so as to dramatically reduce the volume of molten metal that is inlet into the transfer block 30 from hitting the interior wall 32 opposite to the pump discharge (inlet opening of the transfer block).

As can be seen in FIGS. 6B and 7B, in both models, there is a significant circular flow pattern. This is the case regardless of the overall transfer block shape, even a square transfer block (i.e., a square interior surface 32 from a top view), due to the large flow entering a single side of the transfer block 30. This can cause significant turbulence on the top surface when the post 38*a* and diffuser plate are absent. Even though the vertical lift is slow, the horizontal movement of the metal can be high.

This disclosure utilizes the diffuser plate 42 that can be placed inside the transfer block 30 to mostly eliminate the horizontal flow. The horizontal flow just above the diffuser plate 42 (FIG. 9B) is greatly reduced compared to just below the diffuser plate (FIG. 8B). Since horizontal flow is undesirable when moving the molten metal vertically, this is a significant improvement in operation of the transfer block 30 compared to a typical riser. The molten metal must travel vertically through the through holes 44 of the diffuser plate 42, further reducing the horizontal component to the flow as it travels out of the through holes 44 in the region above the diffuser plate 42. FIG. 9B shows a much larger area of molten metal having low velocity above the diffuser plate compared to FIG. 8B below the diffuser plate.

The features of this disclosure allow the transfer pump system 10 to perform much faster starts, as well as to reduce surface turbulence. Furthermore, this allows the benefits of this system to be realized in a much more compact system, as the conventional way to solve this issue would be to make the riser even larger yet, or significantly reduce the flow rate.

A cover 70 for the upper end portion of the transfer block 30 includes a fitting around an opening for receiving a conduit through which inert gas is provided. Flowing inert gas down into the transfer block 30 prevents or reduces the amount of oxide formation should any turbulence occur, such as if the diffuser plate was damaged or if the transfer block was operated outside of normal parameters. It may also help to reduce oxide formation on the sides of the transfer block as the metal level changes, making cleaning and normal maintenance easier.

At the outlet of the transfer block 30 a detachable outlet nozzle 56 can be fastened using a bolt on design with a refractory gasket placed between the transfer block and the outlet nozzle, allowing the end user to customize the outlet for their application, such as should they wish to operate at a lower/higher than standard flow rate.

What is claimed is:

1. A pump system for transferring molten metal comprising a pump comprising:

a motor;

a base adapted to be submerged in molten metal contained in a vessel, said base including at least one inlet opening, an outlet opening and an impeller chamber fluidly communicating with said at least one inlet opening and said outlet opening;

a shaft sleeve adapted to fasten to said base and that extends outside the molten metal;

an impeller adapted for rotation inside said impeller chamber;

a shaft driven by said motor and extending in said shaft sleeve, said impeller being fastened to said shaft; and a transfer block adapted to be submerged in the molten metal and extending outside the molten metal, said transfer block including an interior wall extending along its height, an inlet opening that receives molten metal outlet from said outlet opening of said base, and an outlet;

wherein said transfer block includes an obstruction member disposed in an interior thereof that disrupts an initial flow path of molten metal inlet into said transfer block from said base; and wherein said transfer block includes a diffuser plate inside the interior thereof, said diffuser plate including through holes formed therein.

2. The pump system of claim 1 wherein said obstruction member is a post having a circular cross-sectional shape.

3. The pump system of claim 2 wherein said transfer block is formed of cast ceramic material and said post is part of the cast ceramic material.

4. The pump system of claim 2 wherein said post is centrally located in the interior of said transfer block, an annular space being disposed radially outward of said post between said interior wall and said post, said diffuser plate forming an upper surface of said annular space.

5. The pump system of claim 1 wherein said interior wall includes at least two notches or inwardly protruding guides adapted to engage said diffuser plate to prevent rotation of said diffuser plate, said guides extending along the height of said transfer block.

6. The pump system of claim 5 wherein said guides end spaced above said obstruction member, permitting said diffuser plate to be rotated into a fixed position once it is lowered past said guides.

7. The pump system of claim 5 comprising structure adapted to rotationally lock said diffuser plate into a fixed position.

8. The pump system of claim 1 wherein said interior wall and said diffuser plate have a generally circular shape from a top view and said diffuser plate contacts said interior wall and is disposed above and near said obstruction member.

9. The pump system of claim 1 comprising a lid for covering said transfer block near the upper end portion, and a fitting around an opening in the lid for receiving a conduit for flowing inert gas into said transfer block.

10. The pump system of claim 1 wherein said through holes of said diffuser plate are at least ½ inch in size.

11. The pump system of claim 1 wherein said interior wall is circular in a top view and has a diameter of at least 12 inches for use with said pump rated at about 4000 Lbs/Min of metal flow.

12. The pump system of claim 1 wherein said interior wall is circular in a top view and has a diameter of at least 16 inches for use with said pump rated at about 4000 Lbs/Min of metal flow.

13. The pump system of claim 1 wherein said interior wall is circular in a top view and has a diameter of at least 8 inches for use with said pump rated at about 1000 Lbs/Min of metal flow.

14. The pump system of claim 1 wherein said interior wall is circular in a top view and has a diameter of at least 8 inches.

15. A transfer block made of refractory for transferring molten metal, which is adapted to be submerged in molten metal and to extend outside the molten metal, said transfer block comprising an interior wall extending along a height thereof and forming an interior volume, a lower inlet opening that is adapted to receive an initial flow path of molten metal that flows into the interior volume, and an outlet;

an obstruction member disposed in the interior volume that is adapted to disrupt the initial flow path of molten metal; and a diffuser plate disposed in the interior volume including through holes formed therein.

16. The transfer block of claim 15 wherein said transfer block is formed of cast ceramic material and said obstruction member includes a post that is part of the cast ceramic material.

17. The transfer block of claim 15 wherein said interior wall and said diffuser plate have a generally circular shape from a top view, said obstruction member includes a post that is cylindrical and centrally located in the interior volume, an annular space being disposed radially outward of said post between said interior wall and said post, said diffuser plate forming an upper surface of said annular space.

18. The transfer block of claim 15 wherein said interior wall includes at least two notches or inwardly protruding guides adapted to engage said diffuser plate to prevent rotation of said diffuser plate, said guides extending along the height of said transfer block.

19. The pump system of claim 18 wherein said guides end spaced above said obstruction member, permitting said diffuser plate to be rotated into a fixed position once it is lowered past said guides.

20. The transfer block of claim 15 comprising support structure adapted to be fastened above and to a vessel containing the molten metal, said transfer block and a pump that provides the initial flow path of molten metal being adapted to be mounted to said support structure, and together the pump and said transfer block being able to be repeatedly submerged into and removed from the molten metal of the vessel when moving said support structure.

21. The transfer block of claim 15 comprising a lid for covering said transfer block near an upper end portion thereof, said lid including a fitting around an opening for receiving a conduit for flowing inert gas into said transfer block.

22. The transfer block of claim 15 wherein said through holes of said diffuser plate are at least ½ inch in diameter.

23. The transfer block of claim 15 wherein said through holes of said diffuser plate are at least 1 inch in diameter.

24. The transfer block of claim 15 wherein said interior wall is generally circular from a top view and has a diameter of at least 8 inches.

25. The transfer block of claim 15 wherein said interior wall is generally circular from a top view and has a diameter of at least 16 inches.

* * * * *